UNITED STATES PATENT OFFICE.

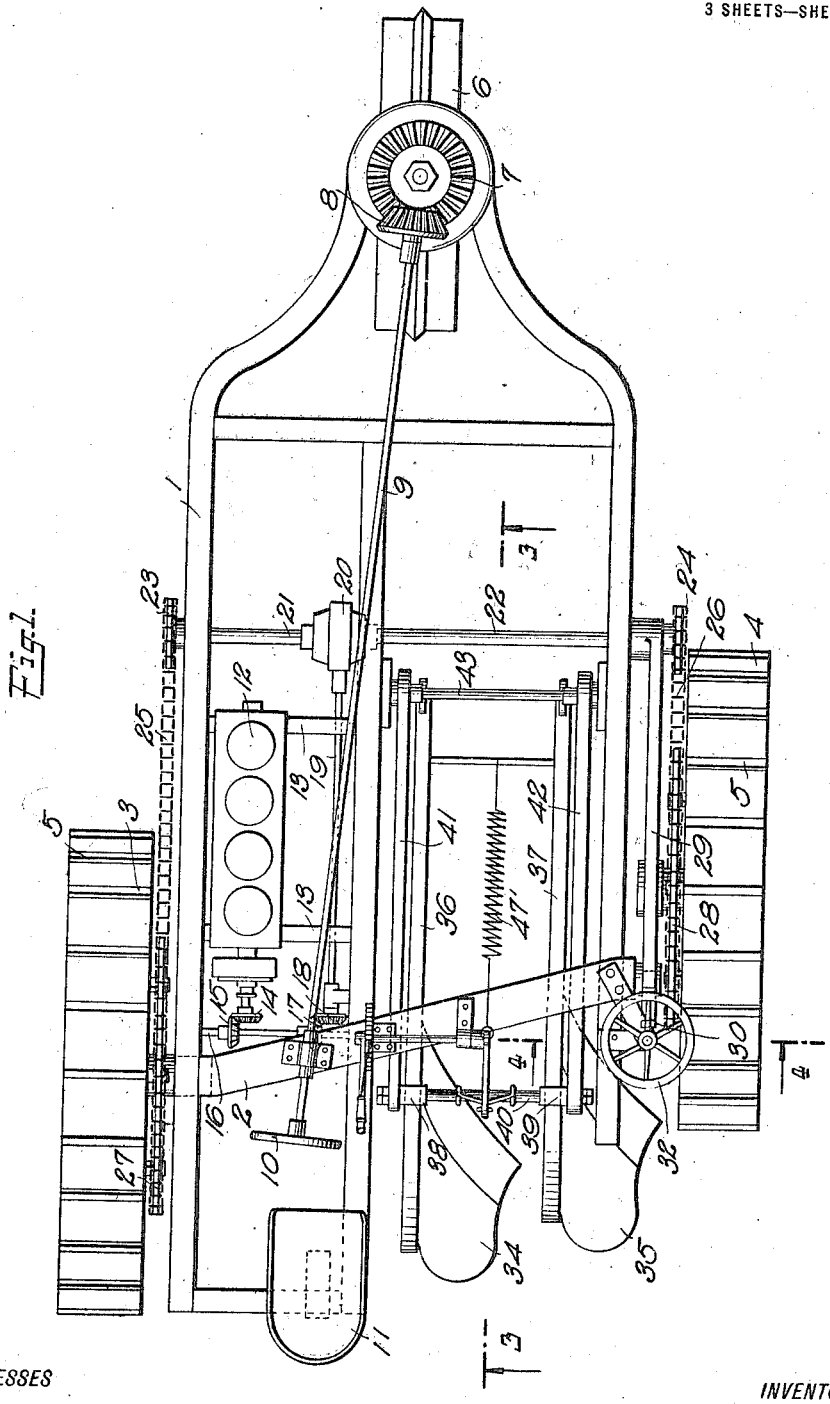

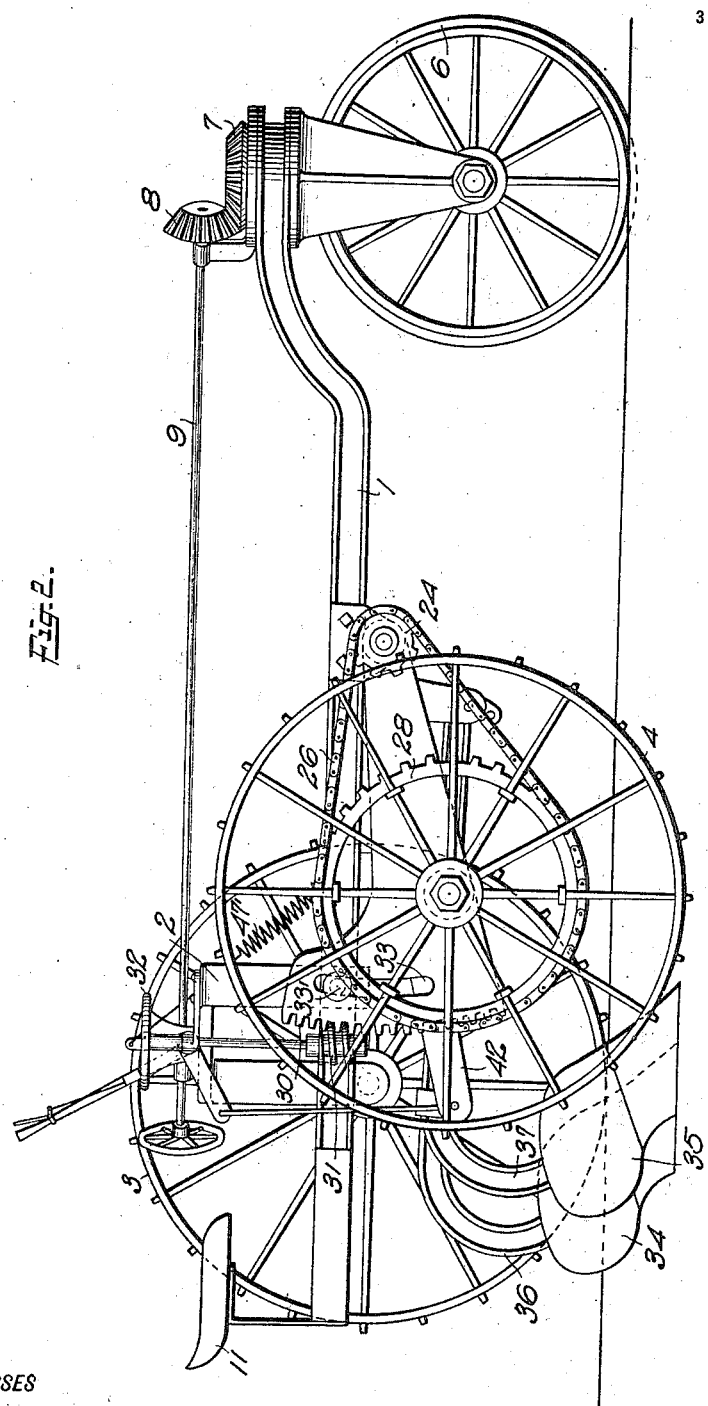

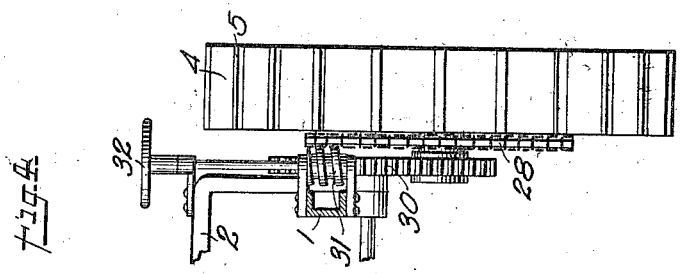
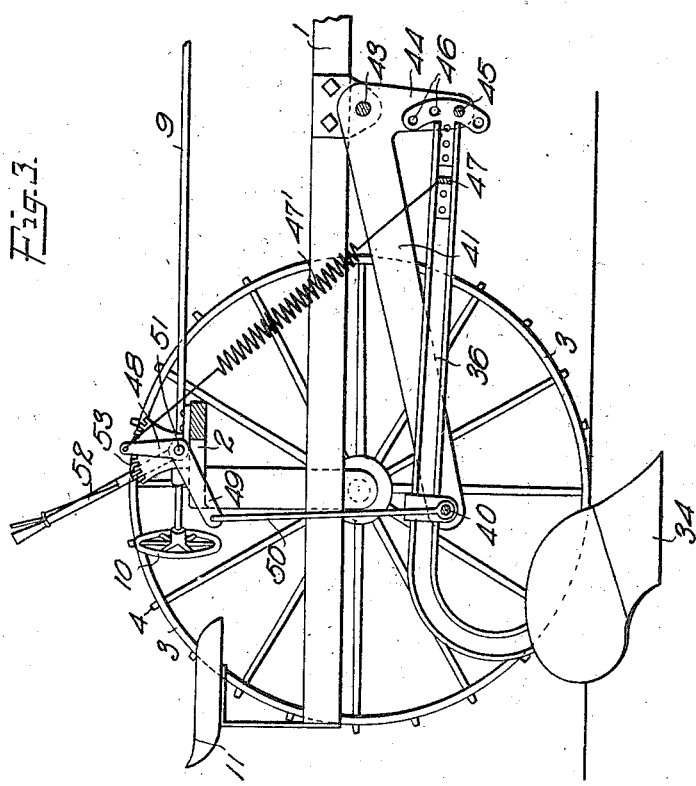

OLIVER O. BOWERS, OF CAPE GIRARDEAU, MISSOURI.

MOTOR-PLOW.

1,192,603.

Specification of Letters Patent.   Patented July 25, 1916.

Application filed October 8, 1915.   Serial No. 54,785.

*To all whom it may concern:*

Be it known that I, OLIVER O. BOWERS, a citizen of the United States, and a resident of Cape Girardeau, in the county of Cape Girardeau and State of Missouri, have invented a new and Improved Motor-Plow, of which the following is a full, clear, and exact description.

This invention relates to plows and particularly to motor plows and has for an object the provision of an improved arrangement whereby the plows may be mounted in place and used in the usual manner of plows or they may be removed and the remaining structure used as a motor tractor.

Another object in view is to provide a motor plow construction and forming the parts so that one wheel will be in advance of the other so as to cause the plows to plow at an even depth on an uneven surface as well as on an even surface.

A still further object in view is to provide a motor plow with a plurality of traction wheels and mechanism for quickly and easily raising and lowering the plows at any time.

A still further object in view is to provide a motor plow with a tractor construction so formed as to permit of an easy adjustment of one of the traction wheels whereby said wheel may be raised and lowered in its respective frame, thus providing an even horizontal position for the frame when one of the wheels is in a furrow as well as when the device is being moved over a road.

In the accompanying drawings: Figure 1 is a top plan view of a motor plow embodying the invention; Fig. 2 is a side view of the structure shown in Fig. 1; Fig. 3 is a detail longitudinal vertical section through Fig. 1, the same being taken on line 3—3; Fig. 4 is a detail fragmentary sectional view through Fig. 1 on line 4—4.

Referring to the accompanying drawings by numerals, 1 indicates a frame of any suitable kind made from a good quality of metal so as to be amply strong for supporting the various parts. A U-shaped axle 2 is connected with frame 1 in any suitable manner and is arranged to carry traction wheels 3 and 4 of any suitable size. These traction wheels are preferably provided with claws or cleats 5 so as to readily engage the earth and force the device along when in operation. A swivel wheel 6 is arranged at the front of frame 1 and is provided with a bevel gear 7 meshing with gear 8 whereby the wheel 6 may be turned as desired for steering a plow. A rod 9 is connected with bevel gear 8 and is operated by a hand wheel 10 arranged near seat 11. A motor 12 of any suitable kind is arranged on cross bars 13 connected with frame 1 so as to operate the bevel gear 14 which gear meshes with bevel gear 15 rigidly secured to shaft 16. Shaft 16 also carries a bevel gear 17 meshing with bevel gear 18. Gear 18 operates the shaft 19 which shaft extends into the casing 20 containing a suitable differential for operating the shafts 21 and 22. These two shafts are mounted in suitable bearings in frame 1 and carry sprockets 23 and 24, which sprockets accommodate chains 25 and 26, respectively. Chain 25 passes over a sprocket 27 rigidly secured to wheel 3, while chain 26 passes over a sprocket 28 rigidly secured to wheel 4, whereby these wheels are independently driven.

In order that the wheel 4 may be raised and lowered as desired so as to allow frame 1 to be horizontal when the wheel is in a furrow, the same is journaled on a suitable axle mounted in a swinging segment 29, which segment is journaled on shaft 22 and is provided with a rack 30 at the rear, which rack meshes with a worm 31 operated by hand wheel 32. The segment 29 is also provided with a slot 33 (Fig. 2) through which a pin 33' passes. This construction provides a guide for the segment while the same is being moved up and down and also assists in holding the segment in place, pin 33' preferably being an extension of the axle 2.

With the construction just described the device may be used as a tractor on a farm or other place for pulling any desired object. However, the frame 1 and associated parts are especially adapted for operating plows 34 and 35. Only two plows are shown but it is evident that the device could be arranged for moving more plows if desired without departing from the spirit of the invention. The plows are provided with beams 36 and 37, respectively, over which are passed clevices 38 and 39, which clevices are journaled on a shaft 40 which shaft also passes through the rear ends of the swings 41 and 42. The forward ends of these swings are pivotally mounted on a rod or shaft 43, which shaft is formed by suitable brackets connected with frame 1. The forward end of each of these swings is provided with a downwardly extending member 44, as shown in Fig. 3. A rod 45 extends through the member 44 on each of the swings and through one of the apertures 46 on the forward end of the respective beams 36 and 37, as shown in Fig. 3. The forward bracing bar 47 is connected with beams 36 and 37 so as to properly space the forward ends thereof. A spring 47' is connected with the bracing bar 47 and with one end of a bell crank lever 48, which bell crank lever is pivotally mounted on the axle 2 so that end 49 thereof may have the link 50 pivotally connected therewith and with rod 40. Bell crank lever 48 is rigidly connected with shaft 51 which is pivotally supported on axle 2 by any suitable means, as for instance, brackets. An operating lever 52 is connected with shaft 51 so as to move the same back and forth and consequently raise and lower the plows 34 and 35. A locking rack 53 is provided on axle 2 to engage the catch on lever 52, as clearly shown in Figs. 1 and 3, whereby the plows may be locked at any desired height, as for instance in a fully elevated position or fully lowered position. The spring 47' is provided to counterbalance some of the weight of the plows whereby any one, as for instance, a boy, may easily operate the lever or handle 52.

In operation, when the parts are arranged as shown in the drawings, the device may be used as a motor plow and the plow raised and lowered as desired and also wheel 4 adjusted as desired. It will be observed that wheel 4 is in advance of wheel 3. This will allow the plows 34 and 35 to be offset in such a manner as to operate properly and to plow at a substantially even depth on level ground and on uneven ground. Whenever it is desired to remove the plows from the ground lever 52 is grasped and operated or swung forwardly, whereupon the swings 41 and 42 will be raised and the plows therewith. If it should be desired to use the device as a tractor the plows may be quickly removed by taking out the bolt or pin 43 and the bolt or pin 40. The spring 47' and associated parts may also be disconnected. After the plows have been removed the device may then be connected up with any vehicle or other article and used as desired.

What I claim is:—

1. In a device of the character described, a frame, a plow, a swing mounted on said frame, a clevis for said swing, said clevis being adapted to surround the beam of said plow adjacent the rear of the beam, and a rod engaging the front of said beam and said swing for connecting the front of the swing with the front of said beam.

2. In a motor plow of the character described, a frame, a plurality of plows provided with beams, a swing for each of said plows, each of said swings being provided with a clevis overlapping the rear part of said beams, a pin extending through said swings at the front and through said beams, and means acting on said swings for raising and lowering the same pivotally, whereby said plows are raised and lowered as desired.

3. In a device of the character described, a frame, a plurality of plows provided with beams, a swing for each of said plows, each of said swings being formed with a long arm extending toward the rear and a short arm extending downwardly, means for pivotally mounting said swings at the juncture of the long arm and the short arm to said frame, means for connecting the forward end of the beam of each of the plows to the respective depending arm of the respective swings, means for connecting the rear end of the respective long arms of the beams of the respective plows, and means connected with the rear end of the long arm for raising and lowering the swing and the plow connected therewith.

In testimony whereof I have signed my name to this specification in the presence of two subscribing witnesses.

OLIVER O. BOWERS.

Witnesses:
FRED NAETER,
ALVIN MACKE.